(12) United States Patent
Mueller-Cristadoro et al.

(10) Patent No.: US 8,882,904 B2
(45) Date of Patent: Nov. 11, 2014

(54) PIGMENT DISPERSIONS, THEIR PREPARATION, AND DISPERSANTS

(71) Applicant: BASF SE, Ludwigshafen (DE)

(72) Inventors: Anna Mueller-Cristadoro, Waldems (DE); Frank Pirrung, Gruenstadt (DE); Frank Dietsche, Schriesheim (DE); Guenter Scherr, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/940,669

(22) Filed: Jul. 12, 2013

(65) Prior Publication Data

US 2014/0014004 A1    Jan. 16, 2014

Related U.S. Application Data

(60) Provisional application No. 61/671,819, filed on Jul. 16, 2012.

(51) Int. Cl.
| | | |
|---|---|---|
| *C09D 7/12* | (2006.01) | |
| *C08G 65/34* | (2006.01) | |
| *C08G 73/02* | (2006.01) | |
| *C09D 17/00* | (2006.01) | |
| *C09C 1/00* | (2006.01) | |
| *C09C 3/00* | (2006.01) | |
| *C09C 3/10* | (2006.01) | |

(52) U.S. Cl.
CPC .............. *C09D 7/125* (2013.01); *C08G 73/024* (2013.01); *C09D 17/001* (2013.01); *C08G 65/34* (2013.01); *C09D 17/004* (2013.01); *C09C 1/00* (2013.01); *C09C 3/00* (2013.01); *C09C 3/10* (2013.01)

USPC .......................................... 106/499; 564/505

(58) Field of Classification Search
CPC .... C09D 7/125; C09D 17/001; C09D 17/004; C08G 65/34; C08G 73/024; C09C 1/00; C09C 3/00; C09C 3/08; C09C 3/10
USPC .................................... 106/448, 499; 564/505
See application file for complete search history.

(56) References Cited

U.S. PATENT DOCUMENTS

| | | |
|---|---|---|
| 7,173,084 B2 | 2/2007 | Pirrung et al. |
| 8,466,250 B2 | 6/2013 | Bruchmann et al. |
| 2009/0149369 A1 | 6/2009 | Tanner et al. |
| 2010/0216361 A1 | 8/2010 | Bruchmann et al. |
| 2012/0053057 A1 | 3/2012 | Cristadoro et al. |
| 2012/0081460 A1 | 4/2012 | Fukaya |
| 2012/0238483 A1 | 9/2012 | Tanner et al. |
| 2013/0184379 A1 | 7/2013 | Stumbe et al. |

FOREIGN PATENT DOCUMENTS

| | | |
|---|---|---|
| WO | WO 03/029318 A1 | 4/2003 |
| WO | WO 2009/045408 A1 | 4/2009 |
| WO | WO 2009/047269 A2 | 4/2009 |
| WO | WO 2013/124830 A1 | 8/2013 |

OTHER PUBLICATIONS

International Search Report issued Sep. 26, 2013, in PCT/EP2013/064398.

European Search Report issued Nov. 19, 2012 in Patent Application No. 12 176 528.3.

*Primary Examiner* — Anthony J Green
(74) *Attorney, Agent, or Firm* — Oblon, Spivak, McClelland, Maier & Neustadt, L.L.P.

(57) ABSTRACT

Branched polyetheramine polyols with a Hazen color number (determined according to DIN ISO 6271) in the range of from 100 to 600 (APHA), based on a polycondensation product of at least one trialkanolamine.

20 Claims, No Drawings

PIGMENT DISPERSIONS, THEIR PREPARATION, AND DISPERSANTS

This application claims the benefit of U.S. Provisional Application No. 61/671,819, filed Jul. 16, 2012.

The present invention refers to branched polyetheramine polyols with a Hazen colour number (determined according to DIN ISO 6271) in the range of from 100 to 600 (APHA), based on a polycondensation product of at least one trialkanolamine.

Pigment dispersions are being used in many applications such as lacquers, printing pastes, printing inks, dying liquors and the like. Such pigment dispersions must meet numerous requirements such as effective assistance to optical properties, such as good colour reproduction of the pigment, high colour strength, high gloss, acceptable seeding and surface roughness, and alterable shades, in addition to good applicability profiles, high versatility with respect to applications, and requirements such as flocculation stability and good rheology. Furthermore, the ingredients for such pigment dispersions should be obtainable from starting materials readily available on the market.

In many cases, though, pigment dispersions known as of today can be improved. In WO 03/029318, pigment dispersants are being provided with excellent properties. The synthesis, however, requires a lot of starting materials and ingredients.

Highly branched polyetheramine polyols are known as adhesion promoters (primers), thixotropic agents or flow improvers, see, e.g., WO 2009/047269. However, in many cases their applicability in pigment dispersions is disadvantageous. Their colour is sometimes unsatisfactory, and their applicability in pigment dispersions may have short-comings.

It was therefore an objective of the instant invention to provide pigment dispersions with excellent properties that do not suffer from the disadvantages discussed above. It was further an objective to provide a process for manufacturing a pigment dispersion wherein said pigment dispersion does not suffer from the disadvantages discussed above. It was furthermore an objective of the instant invention to provide dispersants for pigment dispersions.

Accordingly, the branched polyetheramines defined at the outset have been found, hereinafter also referred to as (inventive) polyetheramine polyols (B) and as (inventive) branched polyetheramine polyols (B). Inventive branched polyetheramine polyols (B) have a color number (determined according to DIN ISO 6271) in the range of from 100 to 600 (APHA), based on a polycondensation product of at least one trialkanolamine.

In one embodiment of the present invention, inventive branched polyetheramine polyols (B) have a polydispersity ($M_w/M_n$) in the range of from 1.1 to 1.8.

In one embodiment of the present invention, inventive branched polyetheramine polyols (B) have a dynamic viscosity in the range of from 300 to 500 mPa·s, determined at 60° C. according to ASTM D7042.

In one embodiment of the present invention, inventive branched polyetheramine polyols (B) have a glass transition temperature of less than 50° C., preferably less than 30° C. and more preferably less than 10° C., determined by DSC. Preferably, inventive branched polyetheramine polyols (B) have a glass transition temperature of at least −55° C.

Inventive branched polyetheramine polyols (B) can be successfully used for making inventive pigment dispersions.

A further aspect of the present invention is a process for preparing inventive branched polyetheramine polyols (B), also being referred to as "inventive process". The inventive process comprises the step of subjecting at least one trialkanolamine to polycondensation under catalysis of at least one catalyst selected from $H_3PO_3$ and phosphinic acid ($H_3PO_2$), characterized in that the temperature during polycondensation does not exceed 215° C., and that said polycondensation is carried out in an atmosphere of an inert gas.

Examples for inert gas are nitrogen and noble gases such as argon.

In order to carry out the inventive process, at least one trialkanolamines will be subjected to polycondensation, for example selected from tri-$C_2$-$C_4$-alkanol-amines, with the alkanol groups in trialkanolamine being different or preferably identical. Trialkanolamine can be subjected to polycondensation or to co-polycondensation, either with one or more trialkanolamine or with one or more dialkanolamines. Examples for suitable trialkanolamines are triethanolamine, tripropanolamine, triisopropanolamine and tributanolamine. Examples for suitable dialkanolamines are N,N-diethanolamine, N,N-di-n-propanolamine, N,N-diisopropanolamine, N,N-di-n-butanolamine, N,N'—$C_2$-$C_8$-ω-hydroxyalkylpiperidine, and polyetherols being based on ethylene oxide and/or propylene oxide.

In one embodiment of the present invention, polyetheramine polyol (B) can be obtained by polycondensation of at least one of triethanolamine, triisopropanolamine and tri-n-propanolamine, or mixtures of at least two of triethanolamine, triisopropanolamine and tri-n-propanolamine. Preference is given to make polyetheramine polyol (B) by polycondensation of either triethanolamine or triisopropanolamine or a mixture of triethanolamine and triisopropanolamine, without using a diol.

In the context with the present invention process, the term polycondensation also refers to co-polycondensation of more than one trialkanolamine and to co-polycondensations with at least one diol.

The catalyst, $H_3PO_3$ or phosphinic acid ($H_3PO_2$), can be applied in bulk or as aqueous solution.

In one embodiment of the present invention, the catalyst, $H_3PO_3$ or phosphinic acid ($H_3PO_2$), is added generally in an amount of 0.001 to 10 mole-%, preferably of 0.005 to 7, more preferably 0.01 to 5 mol-%, based on the amount of the trialkanolamine.

The inventive process can be carried out by using a solvent. Examples of solvents that can be used to perform the inventive process are aromatic and/or (cyclo)aliphatic hydrocarbons and their mixtures, halogenated hydrocarbons, ketones, esters, and ethers. Preference is given to aromatic hydrocarbons, (cyclo)aliphatic hydrocarbons, alkyl esters of alkanoic acids, ketones, alkoxylated alkyl esters of alkanoic acids, and mixtures thereof. Particularly preferred are monoalkylated or polyalkylated benzenes and naphthalenes, ketones, alkyl esters of alkanoic acids, and alkoxylated alkyl esters of alkanoic acids and mixtures thereof.

Preferred aromatic hydrocarbon mixtures are those predominantly comprising aromatic $C_7$ to $C_{14}$ hydrocarbons and possibly encompassing a boiling range from 110 to 300° C., particular preference being given to toluene, o-, m- or p-xylene, trimethylbenzene isomers, tetramethylbenzene isomers, ethylbenzene, cumene, tetrahydronaphthalene, and mixtures comprising them. Examples thereof are the Solvesso® grades from ExxonMobil Chemical, especially Solvesso® 100 (CAS No. 64742-95-6, predominantly $C_9$ and $C_{10}$ aromatics, boiling range about 154 to 178° C.), 150 (boiling range about 182-207° C.), and 200 (CAS No. 64742-94-5), and also the Shellsol® grades from Shell. Hydrocarbon mixtures comprising paraffins, cycloparaffins, and aromatics are also available commercially under the names Kristalloel (e.g., Kristalloel 30, boiling range about 158 to 198° C. or Kristalloel 60: CAS No. 64742-82-1), white spirit (likewise, for example, CAS No. 64742-82-1) or solvent naphtha (light: boiling range about 155 to 180° C., heavy: boiling range about 225 to 300° C.).

Halogenated hydrocarbons are, for example, chlorobenzene and dichlorobenzene or its isomer mixtures. The esters are, for example, n-butyl acetate, ethyl acetate, 1-methoxyprop-2-yl acetate, and 2-methoxyethyl acetate. The ethers are, for example, THF, dioxane, and the dimethyl, diethyl or di-n-butyl ethers of ethylene glycol.

Examples of ketones include acetone, 2-butanone, 2-pentanone, 3-pentanone, hexanone, isobutyl methyl ketone, heptanone, cyclopentanone, cyclohexanone or cycloheptanone.

Examples of (cyclo)aliphatic hydrocarbons are decalin, alkylated decalin, and isomer mixtures of linear or branched alkanes and/or cycloalkanes.

Preference is given, though, to not using a solvent for carrying out the inventive process.

The inventive process is carried out in a way that the temperature during polycondensation does not exceed 215° C. For example, the polycondensation is carried out at temperatures in the range of from 150 to 215° C., preferably 180 to 210° C. Even more preferably, the temperature during polycondensation does not exceed 200° C.

The inventive process can be carried out at a pressure in the range of from 0.5 bar to 20 bar, while normal pressure being preferred. In a preferred embodiment, the inventive process is being performed at normal pressure.

The inventive process is preferably followed by removal or blow-off of residual monomers, for example, by distilling them off at normal pressure or at reduced pressure, e.g., in the range of from 0.1 to 0.5 bar.

In one embodiment of the inventive process, water or other volatile products released during the polycondensation can be removed from the reaction mixture in order to accelerate the reaction, such removal being accomplished by distillation, for example, and optionally under reduced pressure. The removal of water or of other low molecular mass reaction by-products can also be assisted by passing through the reaction mixture a stream of gas which is substantially inert under the reaction conditions (stripping), such as nitrogen, for example, or a noble gas such as helium, neon or argon, for example.

Inventive branched polyetheramine polyols (B) that are prepared at up to 215° C. are typically stable at room temperature for a prolonged period, such as for at least 10 weeks, for example, without exhibiting instances of clouding, precipitation and/or significant increase in viscosity.

To terminate the polycondensation reaction of the inventive process there are a variety of options. For example, the temperature can be lowered to a range in which the reaction comes to a standstill and the polycondensation product is storage-stable. This is generally the case below 60° C., preferably below 50° C., more preferably below 40° C., and very preferably at room temperature. Another option is to deactivate the catalyst by adding a basic component, a Lewis base or an organic or inorganic base, for example.

In one embodiment of the present invention, the polycondensation step takes place in stirred tank reactors or stirred tank reactor cascades.

In one embodiment of the present invention the inventive process will be carried out batch-wise, in semi-batch mode or continuously.

By the described inventive process, inventive branched polyetheramine polyols (B) can be obtained in sufficient purity. Through the aforementioned setting of the reaction conditions and, optionally, through the choice of appropriate solvent it is possible for the inventive branched polyetheramine polyols (B) to be processed further without additional purification.

By the inventive process, inventive branched polyetheramine polyols (B) can be obtained in excellent quality and yield. Inventive branched polyetheramine polyols (B) are well suited for making pigment dispersions. Such pigment are also being referred to as inventive pigment dispersions.

Inventive pigment dispersions comprise
  (A) at least one pigment, hereinafter also being referred to as pigment (A),
  (B) at least one branched polyetheramine polyol, briefly also being referred to as dispersant (B), polyetheramine polyol (B) or branched polyetheramine polyol (B),
  (C) water.

Pigments (A) for the purposes of the present invention are virtually insoluble, finely dispersed, organic or preferably inorganic colorants as per the definition in German standard specification DIN 55944. The inventive pigment dispersions preferably comprise at least one inorganic pigment (A).

Representative examples of organic pigments are monoazo pigments, such as C.I. Pigment Brown 25; C.I. Pigment Orange 5, 13, 36 and 67; C.I. Pigment Red 1, 2, 3, 5, 8, 9, 12, 17, 22, 23, 31, 48:1, 48:2, 48:3, 48:4, 49, 49:1, 52:1, 52:2, 53, 53:1, 53:3, 57:1, 63, 112, 146, 170, 184, 210, 245 and 251; C.I. Pigment Yellow 1, 3, 73, 74, 65, 97, 151 and 183;

disazo pigments, such as C.I. Pigment Orange 16, 34 and 44; C.I. Pigment Red 144, 166, 214 and 242; C.I. Pigment Yellow 12, 13, 14, 16, 17, 81, 83, 106, 113, 126, 127, 155, 174, 176 and 188;

anthanthrone pigments, such as C.I. Pigment Red 168 (C.I. Vat Orange 3);

anthraquinone pigments, such as C.I. Pigment Yellow 147 and 177; C.I. Pigment Violet 31;

anthraquinone pigments, such as C.I. Pigment Yellow 147 and 177; C.I. Pigment Violet 31;

anthrapyrimidine pigments: C.I. Pigment Yellow 108 (C.I. Vat Yellow 20);

quinacridone pigments, such as C.I. Pigment Red 122, 202 and 206; C.I. Pigment Violet 19;

quinophthalone pigments, such as C.I. Pigment Yellow 138;

dioxazine pigments, such as C.I. Pigment Violet 23 and 37;

flavanthrone pigments, such as C.I. Pigment Yellow 24 (CA. Vat Yellow 1);

indanthrone pigments, such as C.I. Pigment Blue 60 (CA. Vat Blue 4) and 64 (C.I. Vat Blue 6);

isoindoline pigments, such as C.I. Pigment Orange 69; C.I. Pigment Red 260; C.I. Pigment Yellow 139 and 185;

isoindolinone pigments, such as C.I. Pigment Orange 61; C.I. Pigment Red 257 and 260; C.I. Pigment Yellow 109, 110, 173 and 185;

isoviolanthrone pigments, such as C.I. Pigment Violet 31 (C.I. Vat Violet 1);

metal complex pigments, such as C.I. Pigment Yellow 117, 150 and 153; C.I. Pigment Green 8;

perinone pigments, such as C.I. Pigment Orange 43 (C.I. Vat Orange 7); C.I. Pigment Red 194 (C.I. Vat Red 15);

perylene pigments, such as C.I. Pigment Black 31 and 32; C.I. Pigment Red 123, 149, 178, 179 (C.I. Vat Red 23), 190 (C.I. Vat Red 29) and 224; C.I. Pigment Violet 29;

phthalocyanine pigments, such as C.I. Pigment Blue 15, 15:1, 15:2, 15:3, 15:4, 15:6 and 16; C.I. Pigment Green 7 and 36;

pyranthrone pigments, such as C.I. Pigment Orange 51; C.I. Pigment Red 216 (C.I. Vat Orange 4);

thioindigo pigments, such as C.I. Pigment Red 88 and 181 (C.I. Vat Red 1); C.I. Pigment Violet 38 (al. Vat Violet 3);

triarylcarbonium pigments, such as C.I. Pigment Blue 1, 61 and 62; C.I. Pigment Green 1; C.I. Pigment Red 81, 81:1 and 169; C.I. Pigment Violet 1, 2, 3 and 27; C.I. Pigment Black 1 (aniline black);

C.I. Pigment Yellow 101 (aldazine yellow), and C.I. Pigment Brown 22.

Specific examples of preferred organic pigments are: C.I. Pigment Yellow 138, C.I. Pigment Red 122, C.I. Pigment Violet 19, C.I. Pigment Blue 15:3 and 15:4, C.I. Pigment Black 7, C.I. Pigment Orange 5, 38 and 43 and C.I. Pigment Green 7.

Preferred are inorganic pigments, for example white pigments such as titanium dioxide (C.I. Pigment White 6), zinc white, pigment grade zinc oxide; zinc sulfide, lithopone; lead white; furthermore white fillers such as barium sulfate and $CaCO_3$ which are also referred to as inorganic white pigments in the context of the present invention, black pigments, such as iron oxide black (C.I. Pigment Black 11), iron manganese black, spinel black (C.I. Pigment Black 27), carbon black (C.I. Pigment Black 7);

Colour pigments, such as chromium oxide, chromium oxide hydrate green; chrome green (C.I. Pigment Green 48); cobalt green (C.I. Pigment Green 50); ultramarine green; cobalt blue (C.I. Pigment Blue 28 und 36); ultramarine blue, iron blue (C.I. Pigment Blue 27), manganese blue, ultramarine violet, cobalt violet, manganese violet, iron oxide read (C.I. Pigment Red 101); cadmium sulfoselenide (C.I. Pigment Red 108); molybdate read (C.I. Pigment Red 104); ultramarine read, iron oxide brown, mixed brown, spinel- and Korundum phases (C.I. Pigment Brown 24, 29 und 31), chrome orange;

iron oxide yellow (C.I. Pigment Yellow 42); nickel titanium yellow (C.I. Pigment Yellow 53; C.I. Pigment Yellow 157 und 164); chrome titanium yellow; cadmium sulfide und cadmium zinc sulfide (C.I. Pigment Yellow 37 und 35); Chrome yellow (C.I. Pigment Yellow 34), zinc yellow, alkaline earth metal chromates; Naples yellow; bismuth vanadate (C.I. Pigment Yellow 184);

Interference pigments, such as metallic effect pigments based on coated metal platelets, pearl luster pigments based on mica platelets coated with metal oxide, and liquid crystal pigments.

Preferred inorganic pigments are selected from inorganic yellow pigments and inorganic white pigments, especially titanium dioxide, barium sulfate and $CaCO_3$.

Inventive pigment dispersions can also comprise mixtures of two or more different pigments (A), in which case it is preferable that at least one pigment be inorganic. The starting pigments are in particulate form, i.e., in the form of particles. Pigment (A) can be selected from crude pigments, i.e., untreated as-synthesized pigments. The particles of pigment (A) may be regular or irregular in shape in that, for example, the particles may have a spherical or substantially spherical shape or a needle (acicular) shape.

In one embodiment of the present invention, pigment (A) is comprised in spherical or substantially spherical shape, i.e., the ratio of the longest diameter to the smallest diameter is in the range from 1.0 to 2.0, preferably up to 1.5.

In one embodiment of the present invention, pigment (A) has an average particle diameter (median, d50) in the range of from 20 nm to 50 µm, preferably in the range from 50 nm to 20 µm and more preferably to a maximum of 5 µm, measured, e.g., by Coulter counter or with a Hegman gauge.

Inventive pigment dispersions further contain at least one polyetheramine polyol (B). Polyetheramine polyol (B) is selected from branched polyetheramine polyols. Polyamine polyols are selected from polymeric products that have a backbone and branches that can carry alcoholic hydroxyl groups. In the backbone, there are amino groups, preferably tertiary amino groups, and ether groups.

In one embodiment of the present invention, polyetheramine polyol (B) has at least three, preferably at least six, more preferably at least ten, terminal functional groups per molecule. Functional groups in the context of polyetheramine polyol (B) are, for example, amino groups, preferably secondary amino groups, and preferably hydroxyl groups.

In principle there is no upper limit on the number of terminal or pendent functional groups, although products with a very large number of functional groups may display unwanted properties, such as high viscosity or poor solubility, for example. In one embodiment of the present invention, polyetheramine polyol (B) has no more than 500 terminal functional groups per molecule, preferably no more than 100.

Polyetheramine polyol (B) can be made by polycondensation of at least one trialkanolamine, for example at least one tri-$C_2$-$C_4$-alkanol-amine, with the alkanol groups in trialkanolamine being different or preferably identical. Trialkanolamines can be subjected to polycondensation or to co-polycondensation, either with one or more trialkanolamine or with one or more dialkanolamines. Examples for suitable trialkanolamines are triethanolamine, tripropanolamine, tri-isopropanolamine and tributanolamine. Examples for suitable dialkanolamines are N,N-diethanolamine, N,N-di-n-propanolamine, N,N-diisopropanolamine, N,N-di-n-butanolamine, N,N'—$C_2$-$C_8$-ω-hydroxyalkylpiperidine, and polyetherols being based on ethylene oxide and/or propylene oxide.

In one embodiment of the present invention, polyetheramine polyol (B) can be obtained by polycondensation of at least one compound selected from triethanolamine, triisopropanolamine and tri-n-propanolamine, or mixtures of at least two compounds selected from triethanolamine, triisopropanolamine and tri-n-propanolamine. Preference is given to make polyetheramine polyol (B) by polycondensation of either triethanolamine or triisopropanolamine or a mixture of triethanolamine and triisopropanolamine, without using a diol.

Polycondensation products of trialkanolamines and poly-co-condensation products of trialkanolamine described above can be used as polyetheramine polyol (B) without chemical modification or derivatization.

Polyetheramine polyol (B) dissolves readily in a variety of solvents, such as water, alcohols, such as methanol, ethanol, n-butanol, alcohol/water mixtures, acetone, 2-butanone, ethyl acetate, butyl acetate, methoxypropyl acetate, methoxyethyl acetate, tetrahydrofuran, dimethylformamide, dimethylacetamide, N-methylpyrrolidone, ethylene carbonate or propylene carbonate.

Polyetheramine polyol (B) has a Hazen colour number (determined according to DIN ISO 6271 ASTM D 1209 in the range of from 100 to 600 (APHA), preferably up to 600. The Hazen colour number can preferably be determined by spectrophotometric means.

In one embodiment of the present invention, the OH number of polyetheramine polyol (B) is 100 mg KOH/g or more, for example, preferably 250 to 700 mg KOH/g, most preferably 350 to 650 mg KOH/g, determined according to DIN 53240, part 2.

In one embodiment of the present invention, the amine number of polyetheramine polyol (B) is in the range of from 200 to 800 mg KOH/g, for example, preferably 250 to 700 mg KOH/g, most preferably 350 to 650 mg KOH/g, determined according to DIN EN ISO 9702.

In one embodiment of the present invention, the weight-average molar weight, $M_w$, of polyetheramine polyol (B) is in the range of from 1,000 to 90,000 g/mol, preferably from 2,000 to 80,000 g/mol, and more particularly from 5,000 to 70,000 g/mol.

In one embodiment of the present invention, the number-average molar weight, $M_n$, of polyetheramine polyol (B) is in the range of from 500 to 50,000 g/mol, preferably in the range of from 1,000 to 40,000 g/mol, as measured by means of gel permeation chromatography using hexafluoroisopropanol as the mobile phase and polymethyl methacrylate (PMMA) as a standard.

In one embodiment of the present invention, polyetheramine polyol (B) has a polydispersity ($M_w/M_n$) in the range of from 1.1 to 1.8.

In one embodiment of the present invention, branched polyetheramine polyol (B) has dynamic viscosity in the range of from 300 to 500 mPa·s, determined at 60° C. according to ASTM D7042, preferably from 350 to 500 mPa·s.

In one embodiment of the present invention, branched polyetheramine polyols (B) have a glass transition temperature of less than 50° C., preferably less than 30° C. and more preferably less than 10° C., determined by differential scanning calorimetry (DSC).

Pigment dispersions according to the invention also contain water (C). The water can be distilled or fully demineralized water.

In one embodiment of the present invention, pigment dispersions according to the present invention do not comprise further ingredients. In other embodiments, pigment dispersions according to the invention can contain at least one additive (D), selected from fatty acids, biocides, wetting agents, polyglycols, resins and surfactants different from branched polyetheramine polyol (B), resins being selected from water soluble alkyd dispersions, water reducible alkyd dispersions, acrylic dispersions, and polyurethane dispersions.

Examples for fatty acids are in particular $C_{10}$-$C_{22}$-carboxylic acids, with one to three C—C-double bonds per molecule or without C—C-double bonds. Examples are myristic acid, palmitic acid, stearic acid, arachidic acid, behenic acid, linoleic acid, linolenic acid, oleic acid, and mixtures of acids based on natural products such as sunflower oil, tallow oil and tall oil fatty acids.

Examples for biocides are benzalkonium chlorides, 2-bromo-2-nitropropane, and isothiazolines such as 1,2-benzisothiazolin-3-one ("BIT"), 2-methyl-2H-isothiazol-3-one ("MIT") and 5-chloro-2-methyl-2H-isothiazol-3-one ("CIT").

Examples for surfactants different from polyetheramine polyol (B) are in particular $C_1$-$C_{10}$-alkyl polyethylene glycol, $C_1$-$C_{10}$-alkyl polypropylene glycol, and $C_1$-$C_{10}$-alkyl co-polyethylene-propylene glycol.

Examples for polyglycols are triethylene glycol, tetraethylene glycol, pentaethylene glycol, polyethylene glycol, for example with an average molecular weight $M_w$ in the range of from 250 to 2,000 g/mol, tripropylene glycol, tetrapropylene glycol, pentapropylene glycol and polypropylene glycol, for example with an average molecular weight $M_w$ in the range of from 300 to 1,000 g/mol, copolymers of ethylene glycol and propylene glycol, in particular block copolymers, and copolymers of ethylene glycol or propylene glycol with 1,2-butylene glycol.

Alkyd dispersions contain at least one water-dispersible or water soluble alkyd resin. Alkyd resins are synthetic polyester resins produced by esterifying polyhydric alcohols, of at least one is trihydric or higher, with polybasic carboxylic acids, and being modified with natural fatty acids or oils and/or synthetic fatty acids, preferably with fatty acids with at least one C—C double bond per molecule. In some embodiments, alkyd resins may be additionally modified with compounds such as resin acids, styrene, benzoic acid, ortho-, meta- or paramethylstyrene, one or more diisocyanates, or one or more compounds selected from acrylic, epoxy, or silicone compounds, see DIN 53183. Suitable diisocyanates for modification are toluene diisocyanate and isophorone diisocyanate.

Examples for acrylic dispersions (also referred to as polyacrylate dispersions or (poly)acrylate binders) are aqueous dispersions that contain at least one poly(meth)acrylate. Poly(meth)acrylates in the context of the present inventions are copolymers of acrylic acid or methacrylic acid or at least one $C_1$-$C_{10}$-alkyl ester of (meth)acrylic acid with at least one comonomer such as vinylaromatic compounds, e.g., styrene, or at least one $C_1$-$C_{10}$-alkyl ester of (meth)acrylic acid, such as methyl acrylate, methyl methacrylate, ethyl acrylate, ethyl methacrylate, n-butyl acrylate, n-butyl methacrylate, 2-ethylhexyl acrylate, or 2-ethylhexyl methacrylate.

Examples for polyurethane dispersions (polyurethane binders) are aqueous dispersions that contain at least one polyurethane with pendent COOH groups or $SO_3^-$-groups, or with polyethylene glycol units.

In one embodiment of the present invention, inventive pigment dispersions can have a solids content in the range of from 1 to 85%, preferably 20 to 50%, percentages being weight %.

Examples for wetting agents are polysilicones and in particular polymers of (meth)acrylic acid or maleic acid, esterified with at least one polyfluorinated alcohol such as HO—$(CF_2)_mCF_2CF_3$ or HO—$CH_2CH_2(CF_2)_mCF_2CF_3$, m being a number in the range of from 2 to 20, preferably an even number in the range of from 2 to 20.

In such polymers of (meth)acrylic acid or maleic acid, all carboxylic acid groups or a certain percentage, for example 30 to 90 mole-%, of the carboxylic acid groups may be esterified with polyfluorinated alcohol. The other carboxylic acid groups may be—if applicable—esterified with a non-fluorinated alcohol such as a $C_1$-$C_6$-alkanol, or they may be free acid groups or salts thereof, for example alkali metal salts or ammonium salts, including organic ammonium salts.

In such wetting agents, maleic acid may be esterified with one or two moles of polyfluorinated alcohol. In case of the respective monoesters, the other carboxylic acid group may be non-esterified, converted into its alkali metal salt, or esterified with a non-fluorinated alcohol such as a $C_1$-$C_6$-alkanol.

In one embodiment of the present invention, inventive pigment dispersions can contain in the range of from 0.3 to 50% by weight, preferably 1 to 30% by weight, polyetheramine polyol (B),
percentages referring to the pigment (A) contents of the respective pigment dispersion.

In one embodiment of the present invention, inventive pigment dispersions can contain in the range of from 0.3 to 50% by weight, preferably 1 to 30% by weight, polyetheramine polyol (B),
a total of 0.1 to 50% by weight of additives (D), preferably 1 to 30% by weight,
percentages referring to the pigment (A) contents of the respective pigment dispersion.

Inventive pigment dispersions can be used, e.g., as component in lacquers or paints, for example in water-based lacquers, water-based paints, in solvent-based paints, and in high-solids lacquers (with solids content of 80% or more). They provide lacquers and paints with excellent properties such as good colour reproduction of the pigment, high colour strength, high gloss, acceptable seeding and surface roughness, and—if applicable—alterable shades, in addition to good applicability profiles, high versatility with respect to applications, and good flocculation stability and good rheology. A further aspect of the present invention is thus the use of inventive pigment dispersions as a component in paints or lacquers. A further aspect of the present invention is paints and lacquers, comprising at least one inventive pigment dispersion.

In one embodiment of the present invention, an inventive paint contains at least one inventive pigment dispersion and at least one binder, e.g., an acrylic binder or a polyurethane binder.

A further aspect of the present invention is a process for preparing a pigment dispersion according to the present invention, comprising the step of dispersing
  (A) at least one pigment,
  (B) at least one branched polyetheramine polyol with a Hazen colour number (determined according to DIN ISO 6271) in the range of from 100 to 600 (APHA),
  (C) water, and optionally,
  (D) least one additive (D), selected from fatty acids, biocides, and surfactants different from polyetheramine polyol (B),
in a dispersing apparatus.

Pigment (A), branched polyetheramine polyol (B), water (C) and additives (D) have been characterized above.

Examples for dispersing apparatuses are mills, such as rotor stator mills, ball mills, bead mills, sand mills, planetary mills, double chamber mills, three roll mills, and stirred ball mills. Further examples for dispersing apparatuses are kneaders, dissolvers, kneader-mixers, planetary kneaders, vat kneaders, and Skandex shakers. Preference is given to ball mills, bead mills, and stirred ball mills.

In one embodiment of the present invention, the dispersing step can be performed at a temperature in the range of from 5 to 80° C.

In one embodiment of the present invention, the dispersing step can be performed over a period of time in the range of from 1 minute to 24 hours, preferably in case of ball mills or stirred ball mills in the range of from 1 to 10 hours, or, in case of three roll mills, 2 to 10 minutes.

A further aspect of the present invention are branched polyetheramine polyols, having a color number (determined according to DIN ISO 6271) in the range of from 100 to 600 (APHA), based on a polycondensation product of at least one trialkanolamine. Inventive branched polyetheramine polyols are also being referred to as (inventive) polyetheramine polyols (B) and as (inventive) branched polyetheramine polyols (B), and they are as defined above.

In one embodiment of the present invention, inventive branched polyetheramine polyols (B) have a polydispersity ($M_w/M_n$) in the range of from 1.1 to 1.8.

In one embodiment of the present invention, inventive branched polyetheramine polyols (B) have a dynamic viscosity in the range of from 300 to 500 mPa·s, determined at 60° C. according to ASTM D7042.

In one embodiment of the present invention, inventive branched polyetheramine polyols (B) have a glass transition temperature of less than 50° C., preferably less than 30° C. and more preferably less than 10° C., determined by DSC. Preferably, inventive branched polyetheramine polyols (B) have a glass transition temperature of at least −55° C.

Inventive branched polyetheramine polyols (B) can be successfully used for making inventive pigment dispersions.

A further aspect of the present invention is a process for preparing inventive branched polyetheramine polyols (B), also being referred to as "inventive process". The inventive process comprises the step of subjecting at least one trialkanolamine to polycondensation under catalysis of at least one catalyst selected from $H_3PO_3$ and phosphinic acid ($H_3PO_2$), characterized in that the temperature during polycondensation does not exceed 215° C., and that said polycondensation is carried out in an atmosphere of an inert gas.

Examples for inert gas are nitrogen and noble gases such as argon.

In order to carry out the inventive process, at least one trialkanolamines will be subjected to polycondensation, for example selected from tri-$C_2$-$C_4$-alkanol-amines, with the alkanol groups in trialkanolamine being different or preferably identical. Trialkanolamine can be subjected to polycondensation or to co-polycondensation, either with one or more trialkanolamine or with one or more dialkanolamines. Examples for suitable trialkanolamines are triethanolamine, tripropanolamine, triisopropanolamine and tributanolamine. Examples for suitable dialkanolamines are N,N-diethanolamine, N,N-di-n-propanolamine, N,N-diisopropanolamine, N,N-di-n-butanolamine, N,N'—$C_2$-$C_8$-ω-hydroxyalkylpiperidine, and polyetherols being based on ethylene oxide and/or propylene oxide.

In one embodiment of the present invention, polyetheramine polyol (B) can be obtained by polycondensation of at least one of triethanolamine, triisopropanolamine and tri-n-propanolamine, or mixtures of at least two of triethanolamine, triisopropanolamine and tri-n-propanolamine. Preference is given to make polyetheramine polyol (B) by polycondensation of either triethanolamine or triisopropanolamine or a mixture of triethanolamine and triisopropanolamine, without using a diol.

In the context with the present invention process, the term polycondensation also refers to co-polycondensation of more than one trialkanolamine and to co-polycondensations with at least one diol.

The catalyst, $H_3PO_3$ or phosphinic acid ($H_3PO_2$), can be applied in bulk or as aqueous solution.

In one embodiment of the present invention, the catalyst, $H_3PO_3$ or phosphinic acid ($H_3PO_2$), is added generally in an amount of 0.001 to 10 mole-%, preferably of 0.005 to 7, more preferably 0.01 to 5 mol-%, based on the amount of the trialkanolamine.

The inventive process can be carried out by using a solvent. Examples of solvents that can be used to perform the inventive process are aromatic and/or (cyclo)aliphatic hydrocarbons and their mixtures, halogenated hydrocarbons, ketones, esters, and ethers. Preference is given to aromatic hydrocarbons, (cyclo)aliphatic hydrocarbons, alkyl esters of alkanoic acids, ketones, alkoxylated alkyl esters of alkanoic acids, and mixtures thereof. Particularly preferred are monoalkylated or polyalkylated benzenes and naphthalenes, ketones, alkyl esters of alkanoic acids, and alkoxylated alkyl esters of alkanoic acids and mixtures thereof.

Preferred aromatic hydrocarbon mixtures are those predominantly comprising aromatic $C_7$ to $C_{14}$ hydrocarbons and possibly encompassing a boiling range from 110 to 300° C., particular preference being given to toluene, o-, m- or p-xylene, trimethylbenzene isomers, tetramethylbenzene isomers, ethylbenzene, cumene, tetrahydronaphthalene, and mixtures comprising them. Examples thereof are the Solvesso® grades from ExxonMobil Chemical, especially Solvesso® 100 (CAS No. 64742-95-6, predominantly $C_9$ and $C_{10}$ aromatics, boiling range about 154 to 178° C.), 150 (boiling range about 182-207° C.), and 200 (CAS No. 64742-94-5), and also the Shellsol® grades from Shell. Hydrocarbon mixtures comprising paraffins, cycloparaffins, and aromatics are also available commercially under the names Kristalloel (e.g., Kristalloel 30, boiling range about 158 to 198° C. or Kristalloel 60: CAS No. 64742-82-1), white spirit (likewise, for example, CAS No. 64742-82-1) or solvent naphtha (light: boiling range about 155 to 180° C., heavy: boiling range about 225 to 300° C.).

Halogenated hydrocarbons are, for example, chlorobenzene and dichlorobenzene or its isomer mixtures. The esters are, for example, n-butyl acetate, ethyl acetate, 1-methoxyprop-2-yl acetate, and 2-methoxyethyl acetate. The ethers are, for example, THF, dioxane, and the dimethyl, diethyl or di-n-butyl ethers of ethylene glycol.

Examples of ketones include acetone, 2-butanone, 2-pentanone, 3-pentanone, hexanone, isobutyl methyl ketone, heptanone, cyclopentanone, cyclohexanone or cycloheptanone.

Examples of (cyclo)aliphatic hydrocarbons are decalin, alkylated decalin, and isomer mixtures of linear or branched alkanes and/or cycloalkanes.

Preference is given, though, to not using a solvent for carrying out the inventive process.

The inventive process is carried out in a way that the temperature during polycondensation does not exceed 215° C. For example, the polycondensation is carried out at temperatures in the range of from 150 to 215° C., preferably 180 to 210° C. Even more preferably, the temperature during polycondensation does not exceed 200° C.

The inventive process can be carried out at a pressure in the range of from 0.5 bar to 20 bar, while normal pressure being preferred. In a preferred embodiment, the inventive process is being performed at normal pressure.

The inventive process is preferably followed by removal or blow-off of residual monomers, for example, by distilling them off at normal pressure or at reduced pressure, e.g., in the range of from 0.1 to 0.5 bar.

In one embodiment of the inventive process, water or other volatile products released during the polycondensation can be removed from the reaction mixture in order to accelerate the reaction, such removal being accomplished by distillation, for example, and optionally under reduced pressure. The removal of water or of other low molecular mass reaction by-products can also be assisted by passing through the reaction mixture a stream of gas which is substantially inert under the reaction conditions (stripping), such as nitrogen, for example, or a noble gas such as helium, neon or argon, for example.

Inventive branched polyetheramine polyols (B) that are prepared at up to 215° C. are typically stable at room temperature for a prolonged period, such as for at least 10 weeks, for example, without exhibiting instances of clouding, precipitation and/or significant increase in viscosity.

To terminate the polycondensation reaction of the inventive process there are a variety of options. For example, the temperature can be lowered to a range in which the reaction comes to a standstill and the polycondensation product is storage-stable. This is generally the case below 60° C., preferably below 50° C., more preferably below 40° C., and very preferably at room temperature. Another option is to deactivate the catalyst by adding a basic component, a Lewis base or an organic or inorganic base, for example.

In one embodiment of the present invention, the polycondensation step takes place in stirred tank reactors or stirred tank reactor cascades.

In one embodiment of the present invention the inventive process will be carried out batch-wise, in semi-batch mode or continuously.

By the described inventive process, inventive branched polyetheramine polyols (B) can be obtained in sufficient purity. Through the aforementioned setting of the reaction conditions and, optionally, through the choice of appropriate solvent it is possible for the inventive branched polyetheramine polyols (B) to be processed further without additional purification.

By the inventive process, inventive branched polyetheramine polyols (B) can be obtained in excellent quality and yield.

The present invention will be illustrated by working examples.

Inventive branched polyetheramine polyols (B) can further be used as component in laundry detergents and in compositions for hard surface cleaning.

General remarks: The Hazen colour number was determined according to DIN ISO 6271, ASTM D 1209, with spectrophotometric detection. (2° norm observer, normal light, layer thickness 11 mm, against distilled water).

Values of 1,000 APHA or more have been determined by extrapolation. The Hazen number is greater than 600 APHA.

Molecular weight: by gel permeation chromatography using a refractometer as the detector. The mobile phase used was hexafluoroisopropanol (HFIP), the standard employed for determining the molecular weight being polymethylmethacrylate (PMMA).

The OH number was determined in accordance with DIN 53240, part 2.

The amine number was determined according to DIN 53176.

I. Synthesis of Inventive Branched Polyetheramine Polyols (B) and Comparison Polyetheramine Polyols I.1 Synthesis of Inventive Branched Polyetheramine Polyol (B.1)

A four-neck flask equipped with stirrer, distillation bridge, gas inlet tube, and internal thermometer was charged with 1500 g triethanolamine ("TEA") and 20 g of a 50% by weight aqueous $H_3PO_2$, and the mixture so obtained was heated under nitrogen to 200° C. The reaction mixture was stirred at 200° C. over a period of 15.5 hours, during which the condensate formed in the reaction is removed by means of a moderate stream of $N_2$ as stripping gas via the distillation bridge. Toward the end of the reaction time indicated, the temperature was lowered to 140° C. and residual low molecular weight products were removed under a pressure of 100 mbar.

Then, the reaction mixture was cooled to ambient temperature, and inventive branched polyetheramine polyol (B.1) was obtained.

$M_n$=4935 g/mol, $M_w$=8130 g/mol $M_w/M_n$=1.6

OH number: 620 mg KOH/g

Amine number: 431 mg KOH/g

Hazen colour number=363 APHA

Dynamic viscosity at 60° C.: 431 mPa·s

I.2 Synthesis of Comparative Branched Polyetheramine Polyol (C-B.2)

A four-neck flask equipped with stirrer, distillation bridge, gas inlet tube, and internal thermometer was charged with 1500 g triethanolamine and 20 g of a 50% by weight aqueous $H_3PO_2$, and the mixture so obtained was heated under nitrogen to 230° C. The reaction mixture was stirred at 230° C. over a period of 4 hours, during which the condensate formed in the reaction is removed by means of a moderate stream of $N_2$ as stripping gas via the distillation bridge. Toward the end of the reaction time indicated, the temperature was lowered to 140° C. and residual low molecular weight products were removed under a pressure of 100 mbar.

Then, the reaction mixture was cooled to ambient temperature, and comparative branched polyetheramine polyol (C-B.2) was obtained.

$M_n$=4132 g/mol, $M_w$=7593 g/mol
$M_w/M_n$=1.8
OH number: 595 mg KOH/g
Amine number 410 mg KOH/g
Hazen colour number more than 1,000 APHA
Gardner colour number: 6
Dynamic viscosity at 60° C.: 241 mPa·s I.3 Synthesis of Inventive Branched Polyetheramine Polyol (B.3)

A four-neck flask equipped with stirrer, distillation bridge, gas inlet tube, and internal thermometer was charged with 1343 g triethanolamine, 191 g triisopropanolamine (TIPA) and 20 g of a 50% by weight aqueous $H_3PO_2$, and the mixture so obtained was heated under nitrogen to 200° C. The reaction mixture was stirred at 200° C. over a period of 15.5 hours, during which the condensate formed in the reaction is removed by means of a moderate stream of $N_2$ as stripping gas via the distillation bridge. Toward the end of the reaction time indicated, the temperature was lowered to 140° C. and residual low molecular weight products were removed under a pressure of 100 mbar.

Then, the reaction mixture was cooled to ambient temperature, and inventive branched polyetheramine polyol (B.3) was obtained.
Molar ratio TEA-TIPA: 9:1
$M_n$=4664 g/mol, $M_w$=7817 g/mol
$M_w/M_n$=1.7
OH number: 600 mg KOH/g I.4 Synthesis of Inventive Branched Polyetheramine Polyol (B.4)

A four-neck flask equipped with stirrer, distillation bridge, gas inlet tube, and internal thermometer was charged with 1343 g triethanolamine, 191 g triisopropanolamine (TIPA) and 20 g of a 50% by weight aqueous $H_3PO_2$, and the mixture so obtained was heated under nitrogen to 210° C. The reaction mixture was stirred at 210° C. over a period of 7 hours, during which the condensate formed in the reaction is removed by means of a moderate stream of $N_2$ as stripping gas via the distillation bridge. Toward the end of the reaction time indicated, the temperature was lowered to 140° C. and residual low molecular weight products were removed under a pressure of 100 mbar.

Then, the reaction mixture was cooled to ambient temperature, and inventive branched polyetheramine polyol (B.4) was obtained.
Molar ratio TEA-TIPA: 9:1
$M_n$=4056 g/mol, $M_w$=7696 g/mol
$M_w/M_n$=1.9
OH number: 618 mg KOH/g I.5 Synthesis of Inventive Branched Polyetheramine Polyol (B.5)

A four-neck flask equipped with stirrer, distillation bridge, gas inlet tube, and internal thermometer was charged with 1194 g triethanolamine, 382 g triisopropanolamine (TIPA) and 20 g of a 50% by weight aqueous $H_3PO_2$, and the mixture so obtained was heated under nitrogen to 200° C. The reaction mixture was stirred at 200° C. over a period of 12.5 hours, during which the condensate formed in the reaction is removed by means of a moderate stream of $N_2$ as stripping gas via the distillation bridge. Toward the end of the reaction time indicated, the temperature was lowered to 140° C. and residual low molecular weight products were removed under a pressure of 100 mbar.

Then, the reaction mixture was cooled to ambient temperature, and inventive branched polyetheramine polyol (B.5) was obtained.

Molar ratio TEA-TIPA: 4:1
$M_n$=4561 g/mol, $M_w$=7695 g/mol
$M_w/M_n$=1.7
OH number: 625 mg KOH/g II. Manufacture and Testing of Pigment Dispersions
Synthesis of Wetting Agent (D.3):

A reaction flask with a nitrogen inlet, overhead stirrer and thermometer, was charged with 160 g of sec. butanol, flushed with $N_2$ and heated to 100° C. A premix consisting of 6.5 g of fluorinated monomer ("intermediate B" from U.S. Pat. No. 7,173,084, HO—$CH_2CH_2(CF_2CF_2)_{m.1}CF_2CF_3$, m.1 being selected that the average molecular weight is 443 g/mol), 30.6 g of acrylic acid, 181.4 g of n-butyl acrylate, and 21.8 g of t-butylperoxy-2-ethylhexanoate was added during a period of 4 h to the reaction flask at 100° C. After the addition of the premix, the resulting polymer solution was stirred for 4 h at 100° C. Then, the sec. butanol was distilled off under reduced pressure at 100° C. until a solid content of >98% was reached. The resulting mass was cooled to 60° C. Then 36 g of N,N-dimethyl ethanolamine were added. After homogenization for at 60° C., 124 g of water were added over a period of 30 minutes until a clear solution was obtained. The resulting solution contained (D.3), with a $M_n$ of 1170 g/mol and a polydispersity of 1.6, a solid content of 59.7%, and an acid number of 55 mg KOH/g as a clear light yellow viscous liquid. The solution of (D.3) was used as such, without further purification.

II.1 Manufacture of Pigment Dispersions
General Procedure:

A glass jar was charged with water, polyetheramine polyol (B) according to examples I.1, titanium dioxide pigment (A.1) (Kronos® 2130, oil number 15.5 g/100 g according to DIN EN ISO 787-5) (average particle diameter (primary particles) 0.5 µm) and, optionally, tall oil fatty acid (D.1) according to table 1. Glass beads (diameter 4 mm) were added to the paste so formed, and the glass jar was then shaken in a Skandex for two hours. The beads were removed by centrifugation. Then, the viscosity of the inventive pigment dispersions which had the consistence of a paste was determined.

TABLE 1

Inventive pigment dispersions and comparative pigment dispersions

| Pigment Dispersion | (A.1) [g] | (B.1) [g] | Water [g] | (D.1) [g] | DOP | Viscosity at 60 rpm [mPa · s] |
|---|---|---|---|---|---|---|
| C-PD.1 | 26.25 | — | 8.75 | — | | >1 Mio |
| PD.2 | 26.25 | 0.26 | 8.5 | — | 1% | 139.000 |
| PD.3 | 26.25 | 0.26 | 8.0 | 0.5 | 1% | dry |
| PD.4 | 26.25 | 0.53 | 8.2 | — | 2% | 12.000 |
| PD.5 | 26.25 | 0.53 | 7.2 | 1.04 | 2% | 4.610 |
| PD.6 | 26.25 | 0.79 | 7.96 | — | 3% | 7.400 |
| PD.7 | 26.25 | 0.79 | 6.38 | 1.58 | 3% | 13.300 |
| PD.8 | 26.25 | 1.31 | 7.44 | — | 5% | 4.970 |
| PD.9 | 26.25 | 2.62 | 6.12 | — | 10% | 3.810 |

DOP = active dispersant on pigment
The viscosity of the respective pigment dispersion was measured 24 h after manufacture with a Paar Physika UDS 200 rheometer having a cone/plate geometry. The viscosities at a shear rate of 1.0 1/s have been listed above.

II.2 Testing of Pigment Dispersions

A full shade was prepared by mixing an inventive pigment dispersion (or comparative pigment dispersion) with an acrylic resin (D.2) and wetting agent (D.3). (D.2) was an aqueous acrylic dispersion, with 45% solid content for high gloss lacquers for interior and exterior applications. The corresponding acrylic copolymer was an aqueous dispersion (45% by weight solids content) of a random styrene/n-butyl acrylate copolymer, comonomer ratio: 1:1 by mole, pH value: 8.7, dynamic viscosity: 75 mPa·s (25° C., Brookfield). (D.3)

has been described above, (D.2) was added to pigment dispersion according to table 2 and mixed with a spatula over a period of 2 minutes. The following paints were obtained: inventive paints P.5, P.7 and P.9, and comparative paint C-P.1, see table 2.

TABLE 2

Inventive paints and comparative paints

| Paint | Pigment dispersion [%] | (D.2), [%] | (D.3), [%] | Gloss angle, 60° | Gloss angle, 20° | appearance |
|---|---|---|---|---|---|---|
| C-P.1 | 16.5 | 82.6 | 0.9 | 76 | 50 | 5 |
| P.5 | 16.5 | 82.6 | 0.9 | 78 | 54 | 1 |
| P.7 | 16.5 | 82.6 | 0.9 | 77 | 52 | 2 |
| P.9 | 16.5 | 82.6 | 0.9 | 74 | 47 | 3 |

The amount of (D.3) refers to the solution.

The respective paint was applied to a polyester sheet with a 75 μm wire bar coater as film, and the film was dried over a period of 12 hours at room temperature.

For evaluation the gloss values at a 60° and a 20° angle were determined, and the appearance was evaluated. Negative impacts on appearance were seeding, surface roughness and haze.

Rating for appearance is:
5=very poor
4=poor
3=mediocre
2=good
1=excellent

The appearance refers to the surface quality and indicates the amount of seeding upon incorporation of the paste in the letdown.

The invention claimed is:

1. A branched polyetheramine polyol, which has a Hazen colour number, determined by DIN ISO 6271, of from 100 to 600 APHA, and which is obtained by polycondensation of at least one trialkanolamine and optionally at least one dialkanolamine.

2. The branched polyetheramine polyol according to claim 1, wherein the branched polyetheramine polyol has a polydispersity (Mw/Mn) of from 1.1 to 1.8.

3. The branched polyetheramine polyol according to claim 1, wherein the branched polyetheramine polyol has a dynamic viscosity of from 300 to 500 mPa·s, measured at 60° C. according to ASTM D7042.

4. The branched polyetheramine polyol according to claim 1, wherein no diol is reacted during the polycondensation.

5. The branched polyetheramine polyol according to claim 1, which has at least ten terminal functional groups per molecule.

6. The branched polyetheramine polyol according to claim 5, wherein the functional groups are amino groups and hydroxyl groups.

7. A pigment dispersion, comprising:
(A) a pigment;
(B) the branched polyetheramine polyol of claim 1; and
(C) water.

8. The pigment dispersion according to claim 7, wherein the pigment (A) is selected from the group consisting of an inorganic white pigment and an inorganic yellow pigment.

9. The pigment dispersion according to claim 7, wherein the branched polyetheramine polyol (B) has a polydispersity (Mw/Mn) of from 1.1 to 1.8.

10. The pigment dispersion according to claim 7, wherein the branched polyetheramine polyol (B) is obtained by a process comprising polycondensation of at least one compound selected from the group consisting of triethanolamine, triisopropanolamine, and tri-n-propanolamine.

11. The pigment dispersion according to claim 7, further comprising at least one additive (D), selected from the group consisting of a fatty acid, a biocide, a wetting agent, a polyglycol, a resin, and a surfactant different from the branched polyetheramine polyol (B).

12. The pigment dispersion according to claim 7, wherein the pigment (A) has an average particle diameter of from 20 nm to 50 μm.

13. A process for preparing the pigment dispersion according to claim 7, the process comprising:
dispersing
(A) the pigment;
(B) the branched polyetheramine polyol;
(C) water, and optionally;
(D) at least one additive (D), selected from the group consisting of a fatty acid, a biocide, a wetting agent, a polyglycol, a resin, and a surfactant different from the branched polyetheramine polyol (B),
in a dispersing apparatus.

14. A paint, comprising:
the pigment dispersion of claim 7.

15. A lacquer, comprising:
the pigment dispersion of claim 7.

16. A process for preparing a branched polyetheramine polyol having a Hazen colour number, determined by DIN ISO 6271, of from 100 to 600 APHA, the process comprising:
polycondensation of at least one trialkanolamine in the presence of at least one catalyst selected from the group consisting of $H_3PO_3$ and $H_3PO_2$,
wherein a temperature during the polycondensation does not exceed 215° C., and the polycondensation is carried out in an atmosphere of an inert gas.

17. The process according to claim 16, wherein the at least one trialkanolamine is at least one selected from the group consisting of triethanolamine, triisopropanolamine, and tri-n-propanolamine.

18. The process according to claim 16, wherein the polycondensation is carried out at a temperature of from 180 to 210° C.

19. The process according to claim 16, wherein the polycondensation is carried out at a temperature not exceeding 200° C.

20. The process according to claim 16, wherein the polycondensation is carried out at in the absence of a solvent.

* * * * *